United States Patent
Wolff

(10) Patent No.: US 9,997,084 B2
(45) Date of Patent: Jun. 12, 2018

(54) DRUMSTICK CONTROL TRAINER

(71) Applicant: Bradley James Wolff, Batavia, IL (US)

(72) Inventor: Bradley James Wolff, Batavia, IL (US)

( * ) Notice: Subject to any disclaimer, the term of this patent is extended or adjusted under 35 U.S.C. 154(b) by 0 days. days.

(21) Appl. No.: 15/178,003

(22) Filed: Jun. 9, 2016

(65) Prior Publication Data

US 2017/0358236 A1    Dec. 14, 2017

(51) Int. Cl.
*G09B 15/00* (2006.01)
*G10D 13/00* (2006.01)

(52) U.S. Cl.
CPC .......... *G09B 15/00* (2013.01); *G10D 13/003* (2013.01)

(58) Field of Classification Search
CPC ............ G10D 13/003; G10H 2220/185; Y10T 16/466; B27L 9/00
USPC ......................................... 84/422.4
See application file for complete search history.

(56) References Cited

U.S. PATENT DOCUMENTS

| 7,435,889 | B1 * | 10/2008 | Heidt | ............ | G10D 13/003 84/320 |
| 2009/0007755 | A1 * | 1/2009 | Rivers, Jr. | ............ | G10D 13/003 84/422.4 |

* cited by examiner

*Primary Examiner* — Kimberly Lockett

(57) ABSTRACT

A drumstick having an attachment to strap it to the thumb of the drummer. The attachment also goes through a hole in the drumstick to allow the stick to freely rotate in its proper plane of motion, allowing the drummer the chance to practice drumming without overly squeezing the drumstick as well as playing the drums with no risk of dropping the drumsticks.

15 Claims, 3 Drawing Sheets

FIG. 1
FIG. 2
FIG. 3
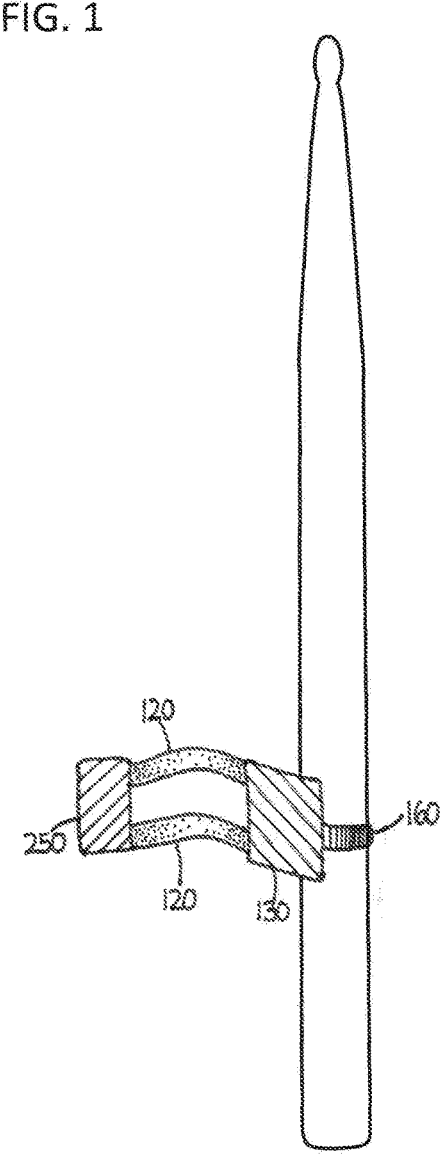
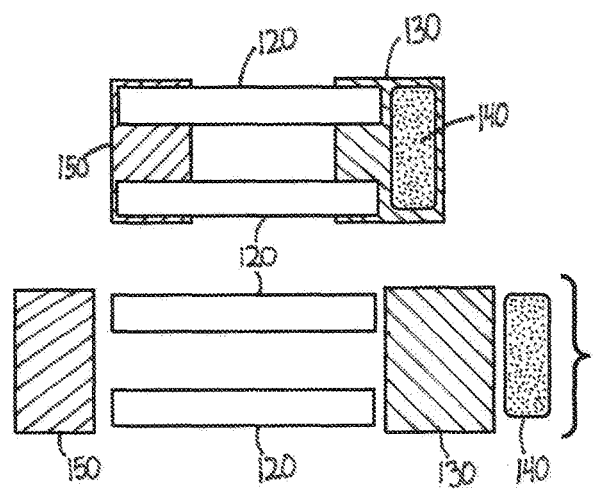
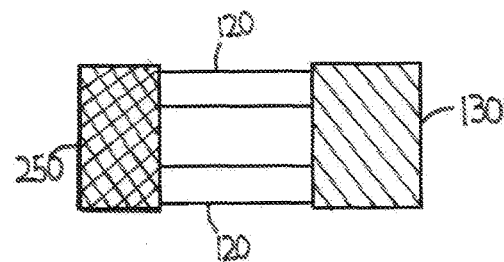

DRUMSTICK CONTROL TRAINER

TECHNICAL FIELD

The general field of the invention is percussion instruments

BACKGROUND OF THE INVENTION

The general field of the invention is percussion instruments, and specifically about the gripping of the sticks that percussive musicians use in their playing. Beginning, and sometimes experienced, drummers tend to squeeze their sticks harder than is ideal, leading to a slower advancement of skills. Also, drummers of any skill level have issues with occasionally dropping their drumsticks due to problems with their grip or due to sweaty hands.

BRIEF SUMMARY OF THE INVENTION

There are two technical problems that the Drumstick Control Trainer aids percussive musicians in solving. First, beginning drummers, and sometimes experienced ones, often have a hard time transitioning from just outright squeezing the drumstick with the whole hand into utilizing a more relaxed grip which encourages the drumstick to be mobile within the hand. The problem with squeezing the drumstick with the whole hand is that it restricts the ability to bounce the drumstick or play with advanced speed or endurance because the stick's own momentum cannot be used in any way. Because the invention comfortably straps a drumstick to the thumb that still has its full ability to rotate in its ideal plane of motion, drummers can practice while using a relaxed grip or completely forgoing the use of the index finger in gripping the stick, requiring the drummer to gain feel and competence in using the remaining fingers to control the stick. The second problem that the invention addresses is the issue of drummers dropping their drumsticks while practicing or performing. Whether due to using a poor grip or having sweaty hands, drummers have long had to deal with drumsticks flying out of their hands, sometimes at very inopportune times during a performance. Because the invention straps comfortably to the thumb and in no way precludes a drummer from using their regular grip, drummers can use the invention in their practice and performance to ensure that the stick stays in their hand the whole time.

BRIEF DESCRIPTION OF THE DRAWINGS

FIG. 1 is the fully constructed invention.

FIG. 2 is the strapping portion of the invention that straps around the thumb via a hook and loop system. The section with the lines moving from the bottom left to the upper right represents the back side of the loop portion of the hook and loop system. The section with the dots represents the hook portion of the hook and loop system. The exploded view shows the different elements of the strapping portion of the invention.

FIG. 3 is the reverse view of FIG. 2, showing the loop portion of the hook and loop system in the section represented by the diamond crossing pattern.

FIG. 8 shows how the drumstick rotates while the invention is attached, showing the drumstick at both upward and downward angles in relation to the thumb that it is strapped to.

DETAILED DESCRIPTION OF THE INVENTION

Figure 4:
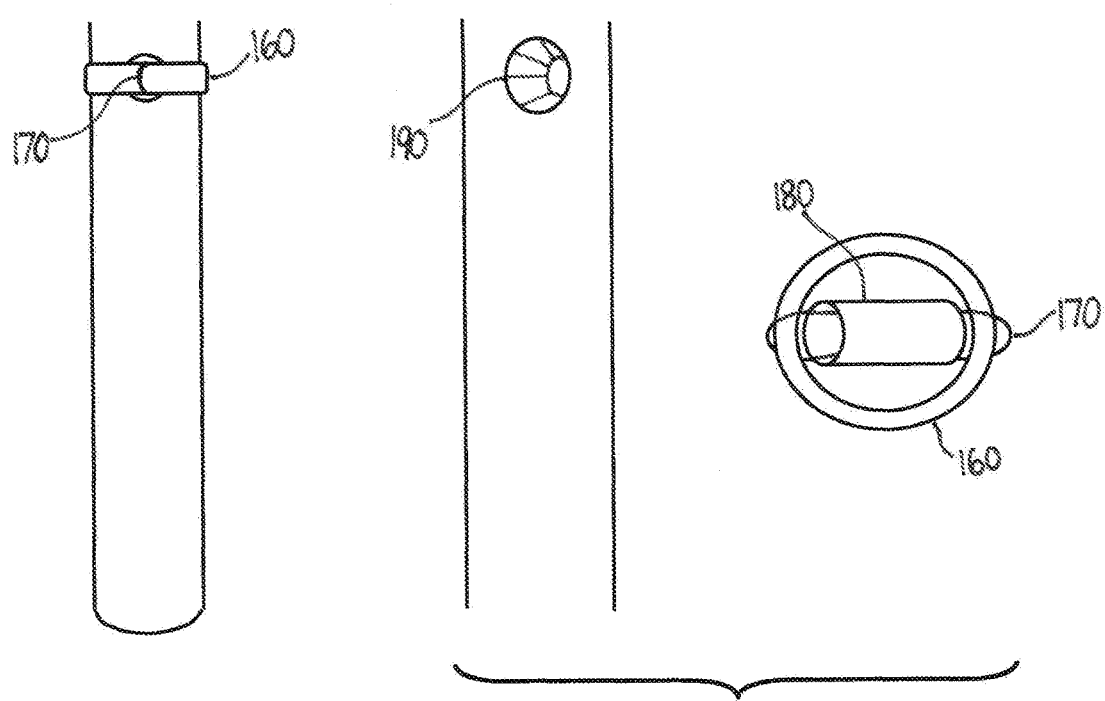
FIG. 4 shows the ring of fabric or similar flexible composition going around the drumstick at approximately the point on the stick where drummers grip the stick between their index finger and thumb. The exploded view shows the tube that goes inside the hole in the drumstick that contains within the flexible wire ring that holds said fabric ring in place while the drumstick is able to rotate.

FIG. 1 depicts a full view of the completed invention. The attachment straps around the thumb at what would be the appropriate point for the drummer to be gripping the drumstick between the thumb and index finger. This allows the drumstick to be able to stay perfectly in place against the thumb regardless of if the drummer is using any other fingers to aid in the gripping of the stick. While strapped in place against the thumb, the drumstick is able to rotate within its ideal plane of motion to be used in the same way that a regular drumstick would be used.

FIG. 2 shows the portion of the invention that straps around the thumb. There is a dense piece of fabric 130 of a size that will cover the majority of the user's thumb, with enough room for the two elastic straps 120 to wrap around the thumb on either side of the thumb knuckle, leaving the thumb knuckle uncovered for the comfort and mobility of the drummer. The two elastic straps 120 are affixed to the dense piece of fabric 130 via sewing or comparable permanent attachment. Having the two parallel straps 120 with the gap between them is necessary to give the user the natural feel and mobility needed to play and practice with the ease and comfort that is felt when playing with a regular drumstick. There is a strip of the hook side of a hook and loop system 140 that is affixed to the dense fabric 130 by sewing or comparable permanent attachment. This strip should cover just under the full length of the sturdy fabric and be sufficiently wide enough, at least ⅜ of an inch, to form a solid hold with the loop side of the hook and loop system 250. The two elastic strips 120 are attached via sewing or comparable permanent attachment to the back side of the loop portion of the hook and loop system 150. It is important to note that the hook side of the hook and loop system 140 and the loop side actually face in opposite directions. The exploded view of FIG. 2 shows the different pieces involved in the constructed strapping portion of the invention before they are affixed via sewing or comparable permanent attachment.

FIG. 3 shows the same strapping portion of the invention as FIG. 2, however it is flipped upside down. The dense piece of fabric 130 is the same in this view, although there is nothing affixed to it on this side. This is the point of the strapping portion of the invention that the thumb rests against when being worn by the user. The loop portion of the hook and loop system 250 is face up when the strapping portion of the invention is orientated this way.

Figure 5:
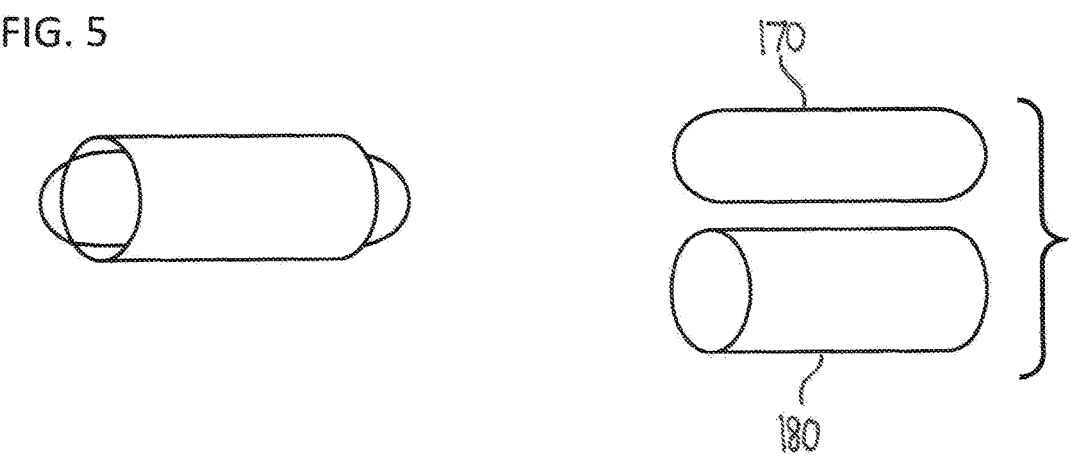
FIG. 5 shows just the tube with the flexible wire ring in it. The exploded view shows the tube and the flexible wire ring that goes inside the tube.

FIG. 4 shows the bottom of the drumstick without the strapping portion of the invention attached. There is a hole 190 going all the way through the stick at approximately the point on the stick where a drummer would hold the stick between the thumb and index finger. An assembly that simultaneously goes through that hole and around the stick is depicted in the exploded view of FIG. 4. This assembly consists of a tube 180 with a length that is equal to the diameter of the drumstick. This tube should have a circumference just slightly smaller than that of the hole in the drumstick; it should fill the hole almost completely, but not be so tight as to restrict the movement of the drumstick. Inside the tube 180, there is a flexible wire ring 170. This flexible wire ring, when inside the tube, has exposed ends that come out just slightly beyond the length of the tube. FIG. 5 depicts just this part of the invention, in both regular and exploded view forms. A ring 160 of fabric or similar flexible composition encircles the drumstick and is on the inside of the exposed ends of the flexible wire ring 170.

Figure 6:
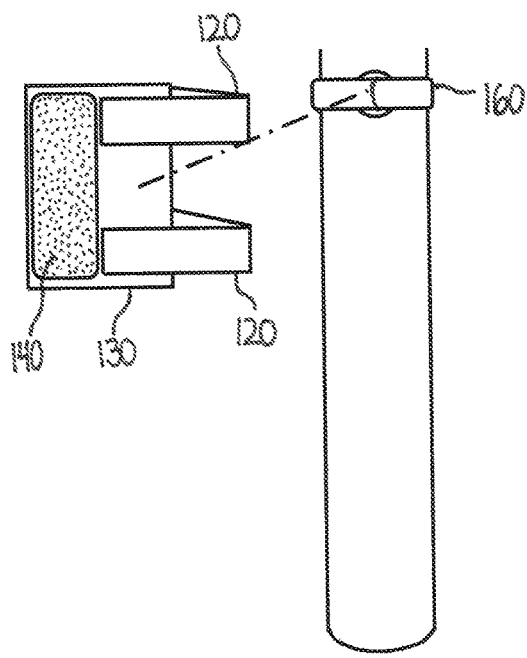
FIG. 6 shows the point on both the strapping portion of the invention and the ring of fabric or similar composition going around the drumstick where they are permanently attached to each other.

FIG. 6 shows how and where the strapping portion of the invention from FIG. 2 and FIG. 3 is attached to the ring 160. At the point just below the strip of the hook portion of the hook and loop system 140 and in between the two ends of the elastic straps 120, the strapping portion is affixed to the ring 160 at and around the point where the flexible wire ring 170 wraps around the ring of fabric or similar flexible composition 160. The strapping portion of the invention should be permanently affixed to the ring of fabric or similar flexible composition 160 such that the tube 180 is naturally orientated at a perpendicular angle to the strapping portion of the invention.

Figure 7:
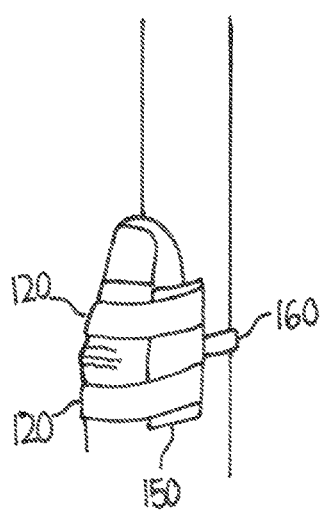
FIG. 7 shows the entire invention strapped onto a thumb.
Figure 8:
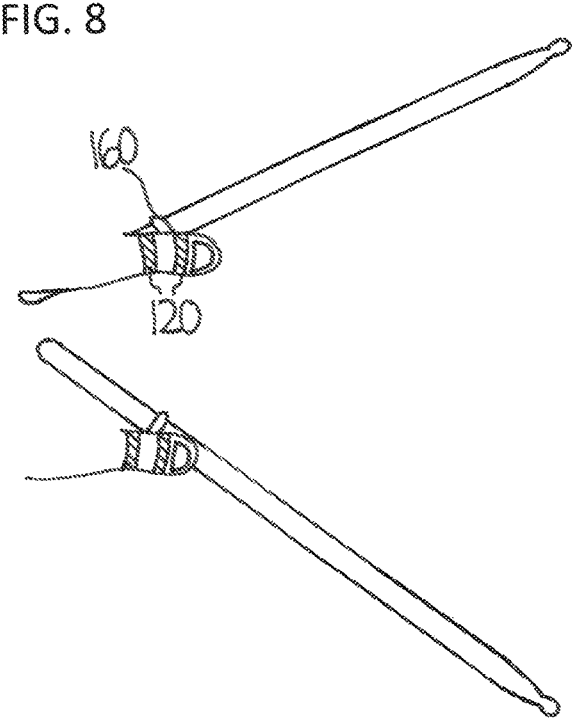

FIG. 7 shows how the completed invention looks while strapped to the thumb. FIG. 8 depicts how the drumstick can rotate in its proper plane of motion while strapped to the thumb. Because the drumstick can properly rotate against the thumb as though the drumstick were being regularly gripped by the user, the user can practice drumming with a more relaxed grip without using too much, or any, squeezing between the thumb and the index finger. This will allow drummers to gain a better control of the momentum and bounces of the stick as they strengthen their abilities to use their middle, ring, and pinky fingers to control the stick. FIG. 7 also illustrates how the invention will keep drummers from dropping their drumsticks while practicing or performing. Drumming, being such a physical activity, often leads to sweaty hands, which often leads to a slippery grip that can cause drumsticks to be dropped. While the invention is strapped on, the drumstick will always be right in position against the thumb of the drummer no matter how sweaty, slippery, or loose his or her grip gets.

I claim:

1. In combination with a drumstick used for percussion, the improvement containing an apparatus for training drummers to control drumsticks using said drummer's hands by removing a need to grip the stick, said apparatus including:
   (a) A tube;
   (b) Said tube mounted in a body of the drumstick
   (c) A fabric ring encircling said drumstick and being permanently attached to said tube such that the tube can rotate independently of said fabric ring;
   (d) A fabric strapping mechanism designed to strap around a thumb of a user;
   (e) Said strapping mechanism being permanently affixed to said fabric ring, allowing the drummer to completely control the drumstick using only a middle, ring, and pinky fingers.

2. The combination, according to claim 1, wherein the drumstick has a bottom and a 0.25 inch diameter throughhole that is positioned 5 inches from the bottom of the stick.

3. The combination, according to claim 1, wherein said tube going through the hole is a hollow and open tube.

4. The combination, according to claim 3, wherein a flexible wire ring is inside said tube and of a size such that a small portion of the wire ring is simultaneously protruding from both sides of the tube.

5. The combination, according to claim 1, wherein the fabric ring encircles the drumstick such that it passes through both said small portions of the flexible wire ring protruding from the tube.

6. The combination, according to claim 1, wherein the strapping mechanism comprises of a piece of strong fabric that is 1 inch by 1.5 inches and has a 0.5 inch by 1.5 inch strip of the hook portion of a hook and loop system permanently affixed to it.

7. The combination, according to claim 6, wherein the strapping mechanism contains two elastic pieces of fabric that are each 0.25 inches wide and 3 inches long and are permanently affixed to said strong fabric such that they are parallel to each other and protruding perpendicularly from the long edge of the strong fabric, both of which abut to said strip of the hook portion of the hook and loop system.

8. The combination, according to claim 7, wherein said elastic pieces are permanently affixed on their other end to a 0.75 inch by 1.5 inch section of the loop portion of a hook and loop system, with the exposed loops orientated such that they face in the opposite direction from said hook portion on said strong fabric.

9. The combination, according to claim 8, wherein a gap between said strong fabric and said loop portion, which are connected by the two elastic pieces of fabric, is 1.5 inches.

10. The combination, according to claim 5, wherein the fabric ring that encircles the drumstick is permanently attached to said strong fabric 0.25 inch below said hook portion of the hook and loop system and equidistant from said elastic pieces and at exactly the point on said fabric ring where it passes through said flexible wire ring.

11. The combination, according to claim 1, wherein the drumstick can rotate independently of said strapping mechanism while being permanently attached to it.

12. The combination, according to claim 1, wherein the drummer can strap the apparatus to the thumb such that the drumstick is properly aligned within the drummer's hand regardless of the use of any fingers for gripping.

13. The combination, according to claim 1, wherein the drummer can forgo a normal grip by completely removing the index finger from the grip so that the drummer can practice controlling the drumstick solely through the use of the middle, ring, and pinky fingers, without any use or intervention of the index finger.

14. The combination, according to claim 1, wherein the light-weight and non-cumbersome nature of the apparatus allows the drummer to utilize a normal grip wherein the thumb and index finger grip the drumstick without removing said apparatus.

15. The combination, according to claim 14, wherein the drummer can ensure that the drumstick will not be dropped while not sacrificing the comfort of using a regular drumstick or the integrity of a normal grip.

* * * * *